Apr. 17, 1923.  
E. S. ROUSH  
CULTIVATOR  
Filed July 31, 1920
1,452,442
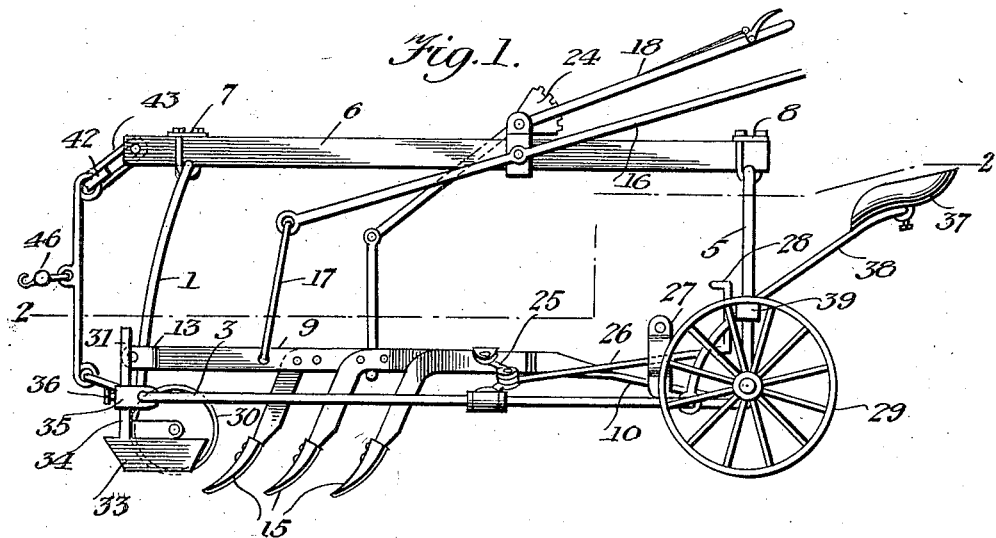
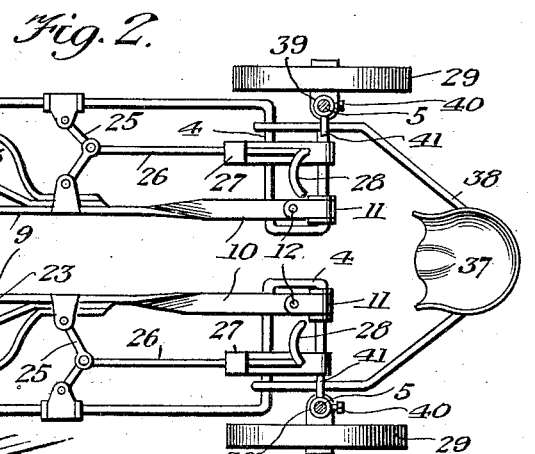
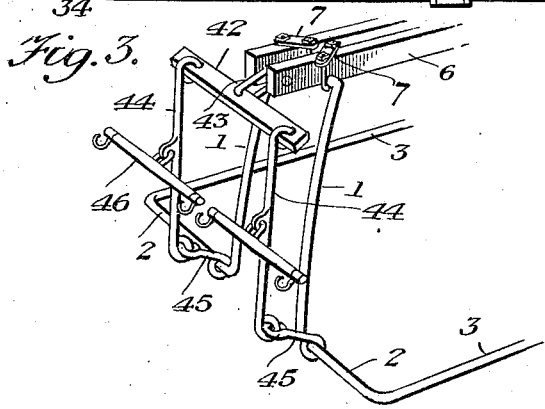
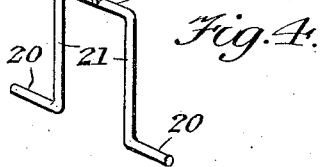
Inventor  
Eli S. Roush  
Gould & Gould  
Attorney Patented Apr. 17, 1923.

1,452,442

UNITED STATES PATENT OFFICE.

ELI S. ROUSH, OF LYNCHBURG, OHIO.

CULTIVATOR.

Application filed July 31, 1920. Serial No. 400,440½.

*To all whom it may concern:*

Be it known that I, ELI S. ROUSH, a citizen of the United States, residing at Lynchburg, in the county of Highland and State of Ohio, have invented certain new and useful Improvements in Cultivators, of which the following is a specification.

This invention relates to an improvement in cultivators, wherein the shovels or other tools are mounted for independent or simultaneous adjustment, the draft animals are connected directly to the frame, and the driver's seat is arranged at the rear of the frame beyond the rearmost shovels.

The frame of the present cultivator is mainly constructed in one section and the shovel beams mounted for vertical and horizontal swinging movement with respect to said frame. Independent means are provided for moving each beam or both beams simultaneously on the vertical pivotal mounting, and other means for independently adjusting the beams on the horizontal pivotal mounting, all of such means being in reach of the driver, from a seat arranged in rear of all tools. The draft is directly from the main frame, providing a tongueless structure for convenient handling in turning.

The invention will be described in the following specification, reference being had to the accompanying drawing in which:—

Fig. 1 is a side elevation of the improved cultivator.

Fig. 2 is a plan of the same, partly in section.

Fig. 3 is a broken perspective, showing the draft connections.

Fig. 4 is a perspective view of the lifting member.

The improved cultivator comprises a main frame, here shown as made up of an integral length of material, such as a rod. The frame includes an upstanding yoke, 1, from the lower ends of which the frame bar or rod is projected laterally and oppositely at 2, and then rearwardly at 3, and at the rear end each length 3 is formed to provide an inwardly extending U-shaped section 4. The final portion of the frame bar, is an upright 5, extending from the rearmost and outermost portion of each section 4.

A draft-bar 6, preferably a pair of parallel strips, is connected, as by clips 7 and 8, with the yoke 1 and the terminals of the uprights 5, the draft-bar being thus supported above, and in a plane between the side bars 3 of the frame.

Shovel beams 9 are mounted on the section 4, at each side of the frame, each of said beams being preferably constructed from an appropriate length of metallic strip, arranged on edge for the greater portion of its length, but given a half turn throughout the rear portion, to provide a flat section 10. A clip 11 is rotatably mounted for vertical pivotal motion on the rear leg of each section 4, and the rear end of the section 10 of each shovel beam is pivotally connected at 12 for horizontal pivoting with relation to the clip. The draft shovel beams are thus capable of independent vertical and horizontal movement. The forward ends of such beams are provided or formed with guide members 13, each receiving one member of the yoke 1, rollers 14, forming part of said members for bearing purposes. The guide members loosely engage the yoke sections, to permit limited horizontal and free vertical movement of the beams 9. Shovels or other tools 15 are secured to the beams in any preferred manner.

The beams are arranged for vertical adjustment, either simultaneously or independently, there being mounted on the draft bar 6, a lever 16 above each beam, the forward end of which lever is connected to the particular beam by a link 17. This permits independent vertical adjustment of the beams, the play being on the bearings of clips 11. The simultaneous vertical adjustment of the beams is provided for through a single lever 18 mounted on the draft-bar 6. The forward end of the lever 18 is loosely connected to a lifting member 19, of inverted U-form, with oposite laterally projecting terminals 20. The vertical bars 21 of the lifting member extend through openings 22 in the beams, preferably formed by bars 23, connecting the beam and one of the shovel bars at an appropriate point. The terminals 20 serve to simultaneously lift the beams when the lever 18 is operated, the free play of the beams on the bars 21 of the lifting member, above the terminals 20, permitting independent adjustment of the beams, when desired, through the appropriate lever 16. The lever 18 is preferably arranged to be locked in adjusted position as by the dog-and-segment means 24, thereby providing for adjusting the cutting depth of the tools at will.

The beams are also capable of lateral adjustment, each being connected with the adjacent frame bar 3, by a toggle lever 25, the joint of which is connected to the forward terminal of a foot rod 26. This rod inclines rearwardly and upwardly, and is slidably supported in a bracket 27, secured to the section 4 of the frame. The rod extends upwardly in the rear and has a lateral foot rest 28, whereby the rod may be operated. The normal positions of the beams break the toggle levers toward the rear, so that either beam may be adjusted inwardly by pressure on the foot rod. The guide members 13 permit the lateral movement of the beams, without interfering with the direct draft of such beams, this lateral movement of the beams being of course on the pivotal mountings 12.

The frame is mounted at the rear end on ground wheels 29, the spindles for which are secured to the U-sections 4 of the frame. The forward end of the frame is supported on one side by a small wheel 30, the spindle for which is extended upwardly at 31, and slidably mounted in a sleeve 32 secured to the frame bar 2, a set screw fixing the adjustment. The opposite frame bar 2 is preferably provided with a runner 33, which through a spindle shaft 34, sleeve 35, and set screw 36, is adjustable with relation to such frame bar 2.

A driver's seat 37 is supported on a seat-frame 38, the forward terminals of which are looped about the forward ends of the U-sections 4 of the main frame. The seat is adjustable as to height, through sleeves 39, mounted on the uprights 5, and held in adjustable relation thereto by set screws 40. Eyes 41, carried by the sleeves, slidably receive the bars from the seat frame 38.

The implement is tongueless, in that projecting part beyond the frame is necessary for draft purposes. The draft connection includes a bar 42, secured by a link 43, to a pin joining the draft-bar strips. Pull-bars 44 extend from bar 42, and are connected by links 45 with the frame bars 2. Ordinary single trees 46 are connected directly to the pull-bars as shown.

The shovels or other tools, are, in the present improvement, entirely in front of the driver, may be seen at all times and adjusted as necessary to comply with conditions. The tools are wholly within the main frame, and in the absence of an extended tongue or the like, the structure as a whole may be readily turned or guided under circumstances where the usual devices of this class could not be used.

Having thus described my invention, what is claimed, is:—

1. An implement of the class described, comprising a main frame having forward upright portions and U-shaped rear portions, beams mounted on the rear portions for vertical and horizontal swinging movement, said beams being mounted for free vertical and limited horizontal play on the upright forward portions of the main frame, and means for adjusting the beams with respect to the main frame.

2. A cultivator comprising a main frame having upright forward portions and U-shaped rear portions, clips mounted for vertical swinging movement on the rear portions of the main frame, beams pivotally connected to the clips, and guides carried by the forward ends of the beams to embrace the upright forward portions of the main frame.

3. A cultivator comprising a main frame having upright forward portions and horizontally-disposed sections at the rear, beams connected to the rear sections for vertical and horizontal swinging movement relative thereto, said beams being connected to the forward uprights of the main frame for vertical and limited lateral play, and means arranged intermediate the beams and main frame for adjusting the beams on their rear section connections and with relation to the forward uprights.

4. A cultivator comprising a main frame, beams connected at their rear ends to the frame for vertical and horizontal swinging movement, and connections between said beams and the main frame at the forward end of the main frame whereby the beams may be adjusted either vertically or horizontally with respect to the main frame on the connections between the rear ends of the beams and the main frame.

5. A cultivator comprising a main frame, implement beams connected to the main frame at the rear to permit horizontal or vertical swinging movement of such beams, connections between the forward ends of said beams and the main frame to permit a free vertical play and a limited horizontal play of such beams, means for vertically swinging said beams, and means for horizontally swinging the beams.

6. A cultivator comprising a main frame having upright forward portions and U-shaped rear portions, beams mounted for vertical and horizontal swinging movement on said rear frame portions, the forward ends of the beams being formed with guides to embrace said frame uprights to permit free vertical movement of the beams and a limited horizontal movement thereof, and means for horizontally swinging said beams.

7. A cultivator comprising a main frame having upright forward portions and U-shaped rear portions, clips mounted for vertical swinging movement on said rear portions, beams pivotally connected to the clips, guides carried by the forward ends of the beams to embrace the upright portions of the main frame, and means for manually moving the beams on said connections.

In testimony whereof, I affix my signature.

ELI S. ROUSH.